United States Patent [19]
Tamaishi

[11] Patent Number: 5,496,052
[45] Date of Patent: Mar. 5, 1996

[54] DAMPER MECHANISM OF BICYCLE FRAME

[75] Inventor: Shigeru Tamaishi, Chigasaki, Japan

[73] Assignee: Miyata Industry Co., Ltd., Chigasaki, Japan

[21] Appl. No.: 251,250

[22] Filed: May 31, 1994

[30] Foreign Application Priority Data

Dec. 21, 1993 [JP] Japan ................... 5-073048 U

[51] Int. Cl.$^6$ .................................................. B62K 25/04
[52] U.S. Cl. ................................... 280/284; 267/293
[58] Field of Search ............................ 280/283, 284, 280/285, 286, 275; 267/292, 293, 294

[56] References Cited

U.S. PATENT DOCUMENTS 5,217,241  6/1993  Girvin ................................. 280/284

FOREIGN PATENT DOCUMENTS

| 453649 | 12/1943 | Belgium. | |
|---|---|---|---|
| 398618 | 6/1919 | France | 280/283 |
| 884138 | 8/1943 | France | 280/284 |
| 91436 | 5/1897 | Germany. | |
| 61-44948 | 12/1986 | Japan. | |
| 18963 | of 1893 | United Kingdom | 280/283 |
| 688 | of 1894 | United Kingdom | 280/283 |
| 15332 | of 1915 | United Kingdom | 280/284 |
| 293941 | 7/1928 | United Kingdom. | |

*Primary Examiner*—Kevin T. Hurley
*Attorney, Agent, or Firm*—Nikaido Marmelstein Murray & Oram

[57] ABSTRACT

In order to improve a running condition of a bicycle by absorbing shocks caused during the running and to reduce a manufacturing cost with a simplified structure, a damper mechanism for a bicycle frame comprises: a damper member interposed between connecting portions of a seat lug and a mono-seat lug, which damper member includes a base element facing to the mono-seat lug, and first and second hinge portions at an upper end of the base element, the first hinge portions being projected from a rear side of the base element so as to be movably pivotally connected to the connecting portion of the seat lug and the second hinge portion being projected from a front side of the base element so as to be movably pivotally connected to the upper portions of the mono-seat lug; and an elastic device disposed between the base element and the mono-seat lug.

4 Claims, 5 Drawing Sheets

5,496,052

DAMPER MECHANISM OF BICYCLE FRAME

BACKGROUND OF THE INVENTION

1. Industrial Field of the Invention

The present invention relates to an improvement of a bicycle frame, and more particularly, to a damper mechanism of the bicycle frame.

2. Description of Related Art

As for absorption of shocks caused during running of a bicycle, there have been conventionally proposed various techniques of weakening the shocks by bending front forks of a bicycle frame. A suspension mechanism has not hitherto been used in the bicycle. This is because the use of the suspension mechanism conflicts with demands of weight reduction and high rigidity which are fundamental requirement for the bicycle.

In recent years, weight reduction of the material has succeeded for component parts of the bicycle more and more. A rider requires a comfortable feeling when he rides on the bicycle. With the commercial spread of mountain bicycles (MTB), various kinds of races such as off road running, down-hill running and so on have been extensively carried out. Thus, there occurs a serious demand for absorbing shocks caused during running of the bicycle on a rough road surface.

Nowadays, there are developed bicycles including various types of shock absorbing technique in which: ① shocks are absorbed by front forks located on the side of a front wheel or a urethane reinforced resin material is incorporated in its head portion; ② a saddle is provided with a suspension; and ③ small-sized shock absorbers are disposed between a mono-seat lug and a top tube pivotably around a seat lug (USSN 07/980281).

In the above-described structure in which the shocks are absorbed by the front forks on the side of the front wheel or the urethane reinforced resin material is incorporated in the head portion, or the saddle is provided with the suspension, however, the shocks are absorbed on the side of the front wheel or at the saddle portion, and a satisfactory shock absorption effect cannot be obtained. There has been developed no bicycle with a damper mechanism having a shock absorbing ability on the side of a rear wheel which is regarded as the most important matter in terms of a function and a feeling of riding of the rider during running of the bicycle, while maintaining a high rigidity. The shock absorbing ability of the conventional damper mechanism is extremely unsatisfactory, particularly in case of off road running.

Also in the shock absorbing technique in which the small-sized shock absorbers are interposed between the top tube and the mono-seat lug pivotably around the seat lug, the mechanism is complicated in structure, inferior in design, increased in weight and manufactured at a high cost, and therefore it is not satisfactory in practical use.

SUMMARY OF THE INVENTION

In view of the above-described problems, an object of the present invention is to provide a marvelous damper mechanism which has an ability to absorb a relatively large shock and a high rigidity, and which can be simplified in structure, reduced in weight and manufactured at a considerably low cost.

More specifically, a damper mechanism for a bicycle frame according to the invention comprises: a damper member interposed between connecting portions of a seat lug and a mono-seat lug, which damper member includes a base element facing to the mono-seat lug, and first and second hinge portions at an upper end of the base element, the first hinge portions being projected from a rear side of the base element so as to be movably pivotally connected to the connecting portion of the seat lug and the second hinge portion being projected from a front side of the base element so as to be movably pivotally connected to the upper portions of the mono-seat lug; and elastic means interposed between the base element and the mono-seat lug.

According to the invention, also, fastening means for the elastic means may be provided on a surface of the mono-seat lug facing to the base element.

Further, in the invention, the elastic means interposed between the base element and the mono-seat lug is composed of a plurality of kinds of soft and hard elastic members which are adapted to be used in a stacked condition with one another.

With the above structure of the damper mechanism according to the invention, a shock or load applied to back forks on the side of the rear wheel of the frame when the bicycle runs, is transmitted to the mono-seat lug at the upper portion of the back forks, so that the second hinge portion of the damper member on the front side thereof, which is connected to the upper portions of the mono-seat lug, is moved obliquely upward in a direction of running of the bicycle against the resistance of the first hinge portions on the rear side of the base element, which are connected to the seat lug. At this time, the base element facing to the mono-seat lug comes closer to the mono-seat lug pivotally around the first hinge portions on the rear side of the base element connected to the seat lug. As a result, the elastic means interposed between the base element and the mono-seat lug is pressed to absorb the shocks.

In the case where the elastic means disposed between the base element and the mono-seat lug is composed of a plurality of kinds of soft and hard elastic members which are stacked on one another for use, the soft elastic member absorbs the small shocks and the hard elastic member absorbs the large shocks.

DETAILED DESCRIPTION OF THE PREFERRED EMBODIMENT

One preferred embodiment according to the present invention will now be fully described with reference to the drawings.

Figure 1:
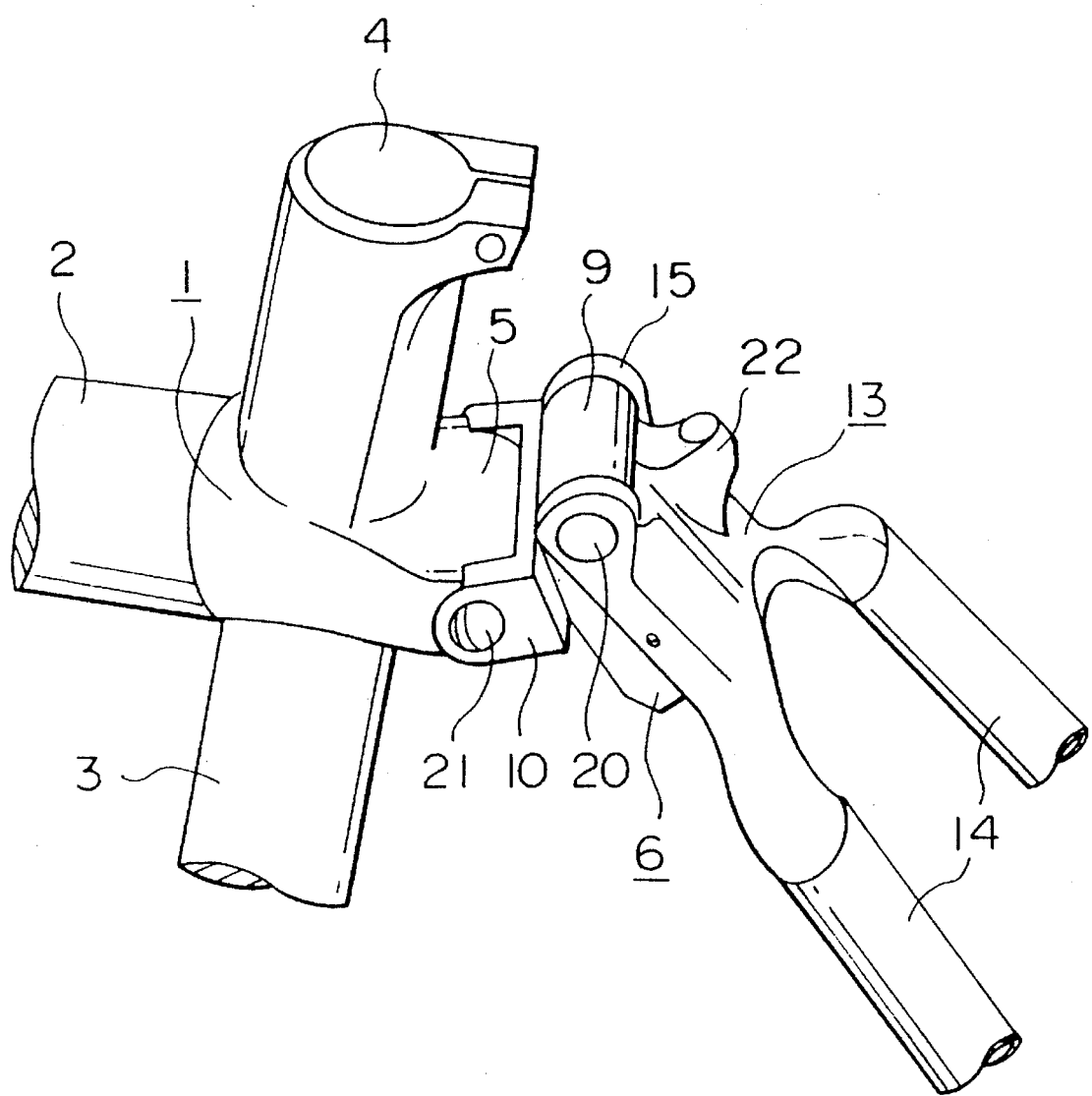
FIG. 1 is a perspective view of an essential portion of a damper mechanism for a bicycle frame according to one embodiment of the present invention.

As shown in FIG. 1, a seat lug 1 is provided with a top tube 2 connected thereto, the top tube extending forwardly from the seat lug in a direction substantially horizontal, and with a seat tube 3 connected thereto, the seat tube extending from the seat lug downwardly. The seat lug 1 includes a seat pillar 4 which projects upwardly and a connecting portion 5 which is formed on a rear portion of the seat lug.

Figure 2:
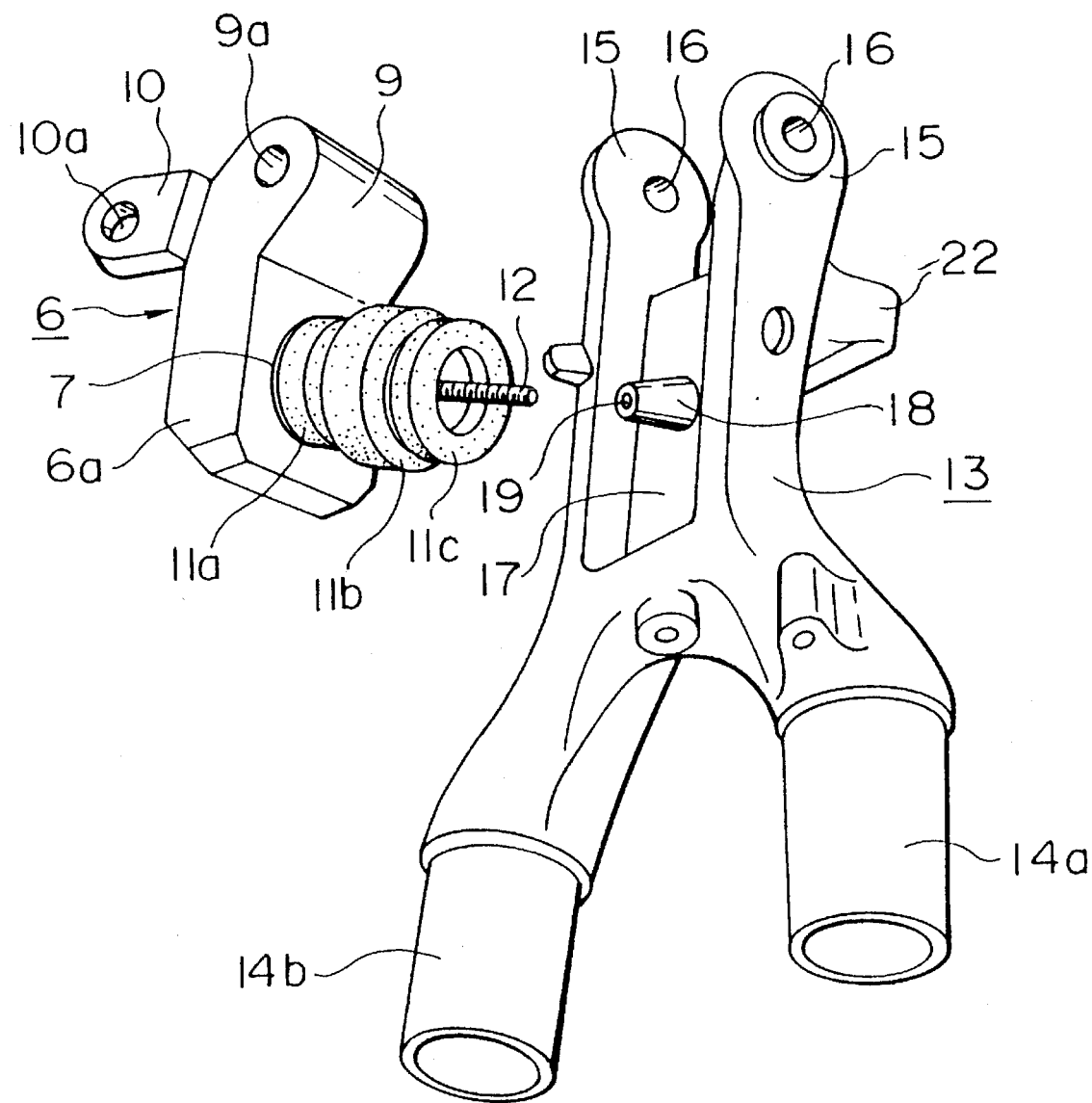
FIG. 2 is an enlarged perspective view of the damper mechanism of the embodiment shown in FIG. 1 and a mono-seat lug when they are disassembled.

A mono-seat lug 13 has, as shown in FIG. 2, connecting portions 14a, 14b for connection with back forks 14, which connecting portions extend downwardly. The mono-seat lug 13 includes a pair of attachment portions 15 formed at its upper end, as shown in FIG. 2. The attachment portions 15 are formed with bearing holes 16 which extend the attachment portions at the substantially central portions. The mono-seat lug 13 also includes a recessed flat portion 17 formed at the intermediate portion. The flat portion 17 has at its central portion a projection 18 with a female-screwed hole 19 in the center thereof. Reference numeral 22 represents a peg for a brake wire.

Figure 3:
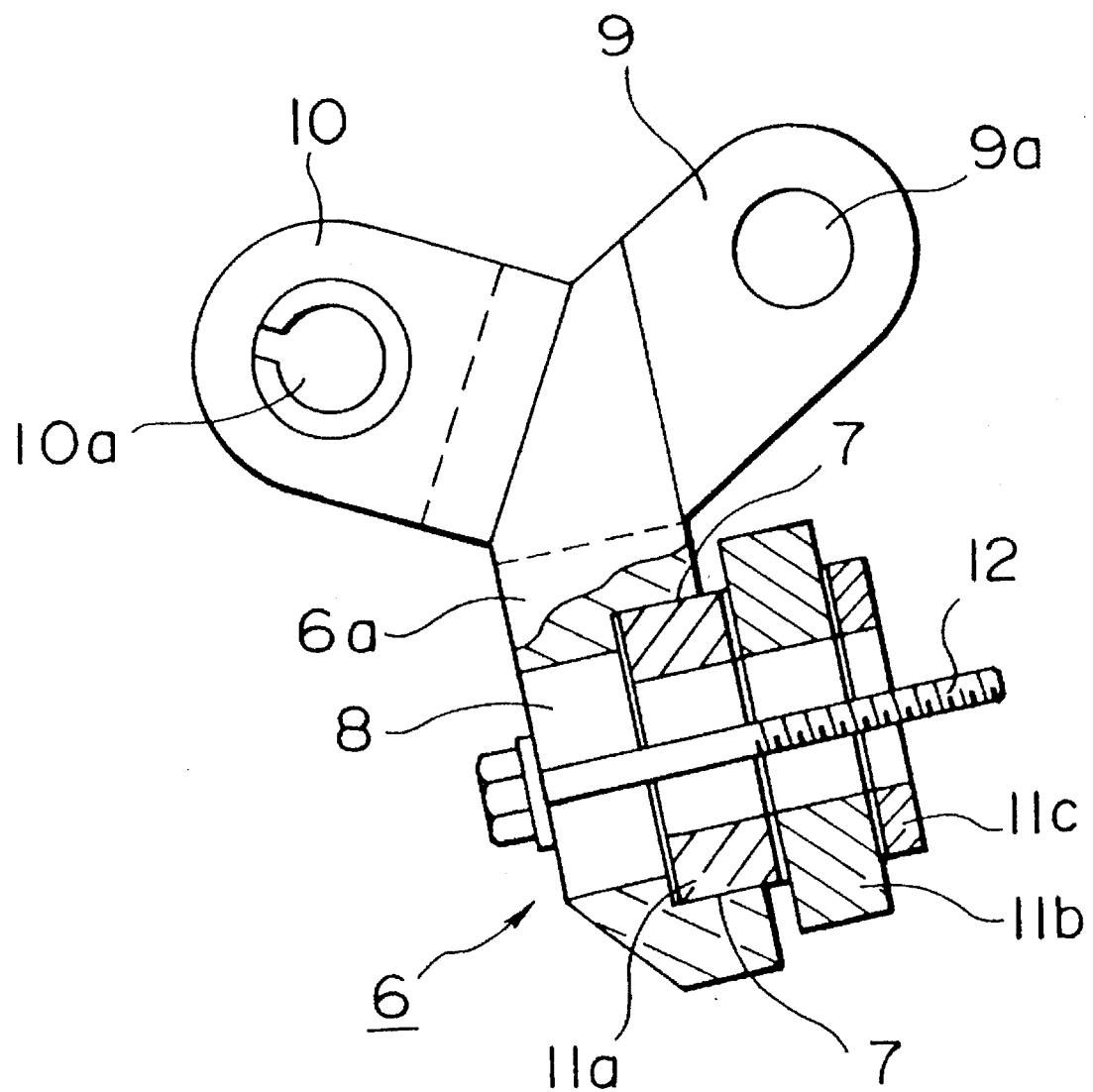
FIG. 3 is an enlarged side elevational view of the damper mechanism of the embodiment shown in FIG. 1, partially showing the same in cross section.

As shown in FIG. 2, a damper member 6 includes a base element 6a facing to the flat portion 17 of the mono-seat lug 13, first hinge portions 10, and a second hinge portion 9. The first hinge portions 10 are formed on a rear side of the base element 6a to project therefrom (as viewed in FIG. 2), and are movably pivotally connected to the connecting portion 5 of the seat lug. The second hinge portion 9 is formed on a front side of the base element 6a at its upper end to project therefrom, and is movably pivotally connected to the attachment portions of the mono-seat lug 13. Referring to FIGS. 2 and 3, a circular recess 7 is formed on the surface of the base element 6a facing to the mono-seat lug 13. The circular recess 7 is provided at a substantially central portion with an elongated hole 8 passing through the base element 6a along an axis of the circular recess 7. The elongated hole 8 has a width enough large to allow a stem of a threaded rod 12 to be loosely fitted into the elongated hole 8.

Reference numerals 11a, 11b and 11c denote elastic members which are set to be interposed between the base element 6a and the flat portion 17 of the mono-seat lug. The elastic members 11a, 11b and 11c are made of resilient material such as rubber, urethane or the like. The respective elastic members are formed in ring-like shapes each of which is circularly hollowed out on the center portion. The elasticities of the elastic members 11a, 11b and 11c are different from one another. The elastic member 11a is relatively soft, the elastic member 11b is relatively hard, and the elastic member 11c is harder than the elastic member 11b. These elastic members are used in combination.

The damper member 6 is movably attached to the seat lug 1 by means of a pin 21 which extends through the connecting portion 5 of the seat lug 1 and connection holes 10a of the first hinge portions 10 on the rear side of the damper member 6 at its upper portion. The damper member 6 is also movably connected to the mono-seat lug 13 by means of a pin 20 which extends through a connection hole 9a of the second hinge portion 9 on the front side of the damper member 6 and attachment holes 16 of the pair of attachment portions 15 provided at the upper end of the mono-seat lug 13. The relatively soft elastic member 11a, the relatively hard elastic member 11b and the harder elastic member 11c are interposed between the base element 6a and the flat portion 17 of the mono-seat lug 13 in this order. The threaded rod 12 is inserted into the elongated hole 8 from the rear side of the base element 6a to extend through the respective elastic members 11a, 11b and 11c substantially along the axis of the elastic members. In this state, a top end portion of the threaded rod 12 is screwed into the female-screwed hole 19 of the projection 18 on the flat portion 17 of the mono-seat lug 13. By adjusting the threaded rod, a degree of pressing the base element 6a against the flat portion 17 of the mono-seat lug 13 can be controlled due to the function of the elastic members 11a, 11b and 11c interposed therebetween. The assembling of the damper member and the mono-seat lug is thus completed.

Figure 4:
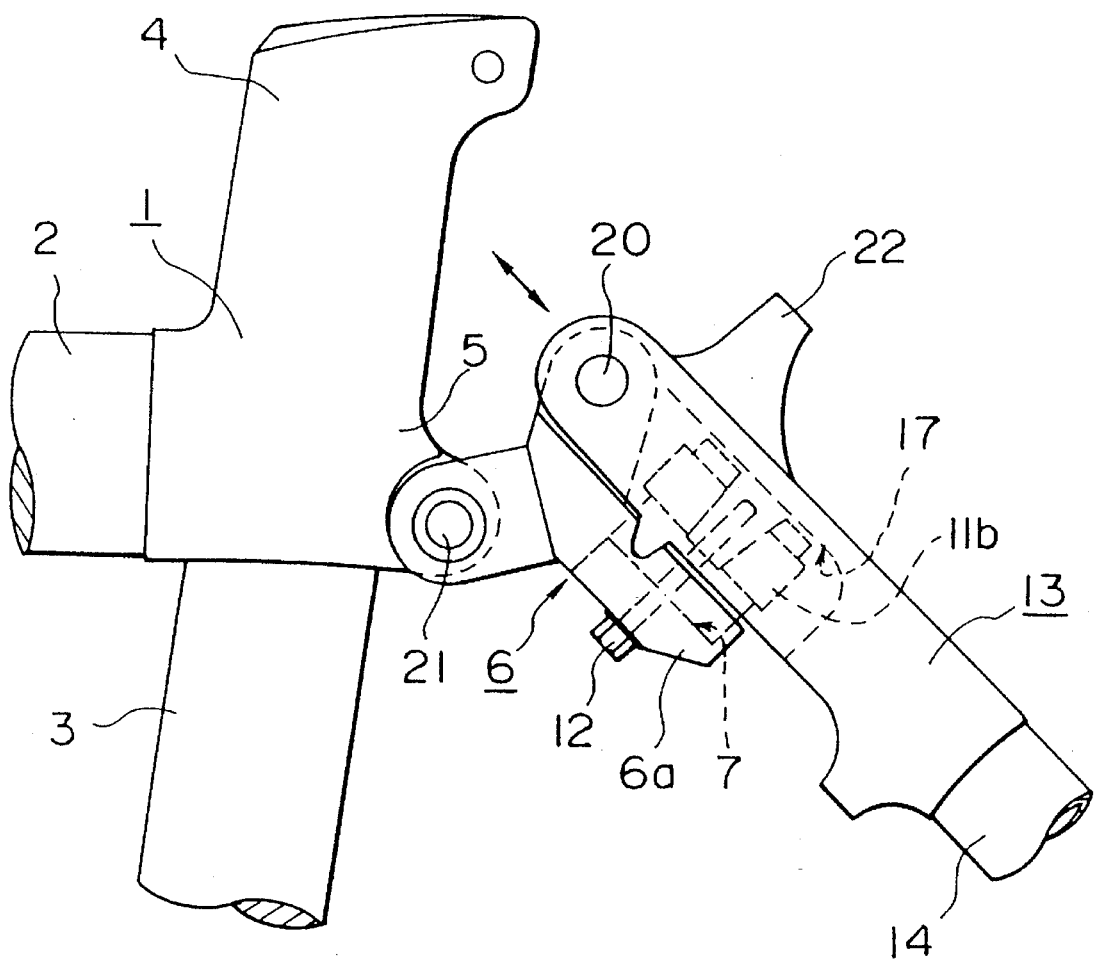
FIG. 4 is a side elevational view of the essential portion of the damper mechanism according to the invention, showing a normal state thereof.
Figure 5:
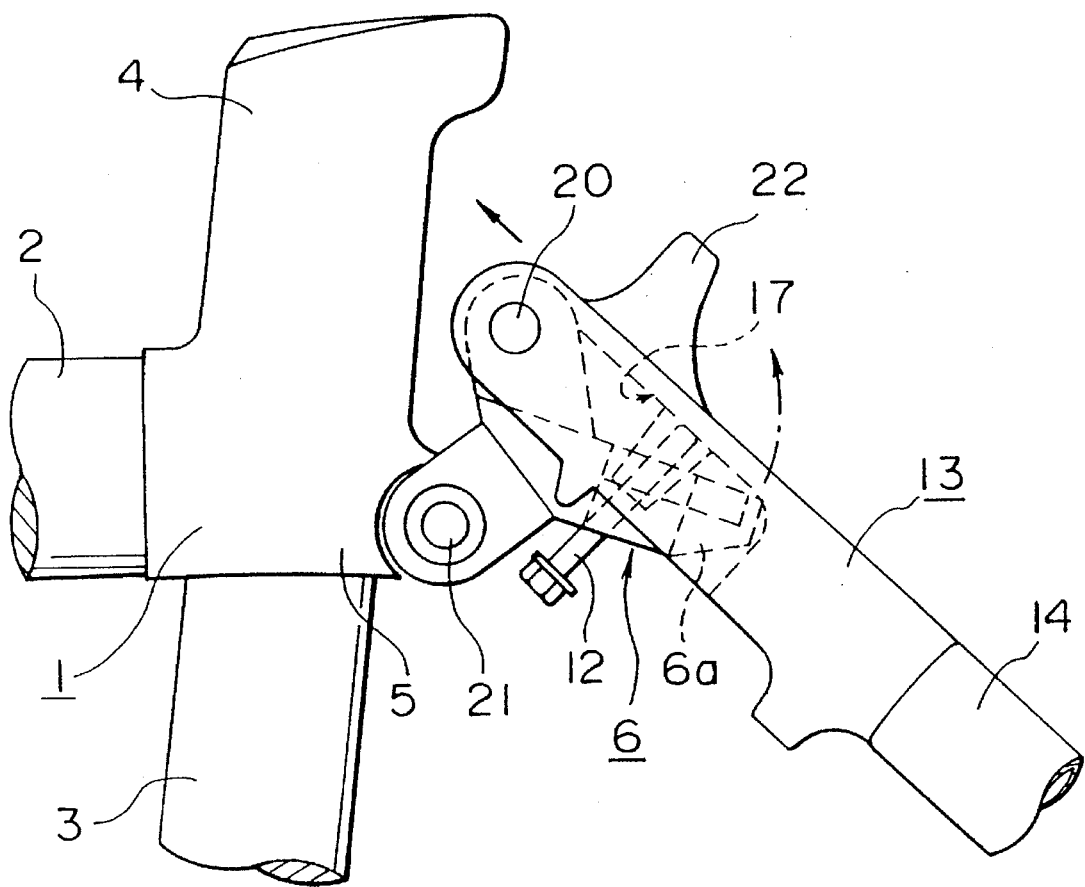
FIG. 5 is a side elevational view of the essential portion of the damper mechanism according to the invention, showing a state when it absorbs shocks.

In the above-described structure, when a rear wheel of a bicycle is subjected to a shock from the road surface during running of the bicycle, the mono-seat lug 13 integrally connected to the upper ends of the back forks 14 is pushed up obliquely upward in a direction of the running as an axle of the rear wheel rises. The mono-seat lug 13 is relatively moved with respect to the damper member 6. As a result, the damper member 6 connected to the mono-seat lug 13 by the pin 20 can move in an anti-clockwise direction (as viewed in FIGS. 1, 4 and 5) around the pin 21 which connects the first hinge portions 10 of the damper member 6 to the connecting portion 5 of the seat lug 1. The base element 6a is press-contacted with the flat portion 17 of the mono-seat lug 13 in the state that the elastic members 11a, 11b and 11c are disposed therebetween, thus absorbing the shock during running of the bicycle (see FIG. 5).

Alternatively, in the above embodiment, although the elastic means disposed between the base element 6a and the flat portion 17 of the mono-seat lug 13 are composed of separate members, these members may be formed of a unitary elastic part. However, it is more preferable that a plurality of kinds of elastic members having different elasticities are used in combination because not only a large shock but also a relatively small shock can be absorbed by such elastic means.

As mentioned above, according to the invention, the damper mechanism is simple in structure, and can be manufactured at a low cost. The structure of the damper mechanism of the invention is excellent in terms of design. Further, according to the invention, the damper mechanism can fully exhibit the ability to absorb the shock from the road surface when the bicycle runs, can act as a satisfactory suspension and maintain a high rigidity. Thus, the rider can obtain a comfortable feeling during running of the bicycle without power loss.

Accordingly, because not only a large shock but also a relatively small impact are absorbed, a remarkable shock absorbing effect can be obtained by the damper mechanism according to the invention in which the elastic means interposed between the base element and the mono-seat lug is composed of a plurality of kinds of soft and hard elastic members which are adapted to be used in a stacked condition with one another.

What is claimed is:

1. A damper mechanism for a bicycle frame comprising:
   a damper member interposed between connecting portions of a seat lug and a mono-seat lug, said damper member including a base element facing to said mono-seat lug, and first and second hinge portions at an upper end of said base element, said first hinge portion being projected from a rear side of the base element so as to be movably pivotally attached to the connecting portion of said seat lug and said second hinge portion being projected from a front side of the base element so as to be movably pivotally attached to the upper portions of said mono-seat lug; and elastic means interposed between said base element of said damper member and said mono-seat lug, said elastic means including a plurality of kinds of soft and hard elastic members which are adapted to be used in a stacked condition with one another.

2. A damper mechanism for a bicycle frame according to claim 1, characterized in that one part of said elastic means is received in a recessed portion whose central axis is concentric with a center of an elongated hole formed in said base element and at least one part of the rest of the elastic means is received in a flat portion on a surface of said mono-seat lug facing to said base element.

3. A damper mechanism for a bicycle frame according to claim 2, characterized in that fastening means for attachment of said elastic means is provided on the surface of said mono-seat lug facing to said base element.

4. A damper mechanism for a bicycle frame according to claim 3 characterized in that said fastening means includes a threaded rod extending through the elongated hole formed in said base element and said elastic means along the axis of the elastic means, and a projecting portion formed on the mono-seat lug and having a female-screwed portion, said threaded rod being screwedly fitted in the female-screwed portion of the projecting portion to thereby control the resiliency of said elastic means.

* * * * *